April 25, 1944.  N. J. JOHNSON  2,347,324
METHOD OF TREE TREATMENT
Filed May 14, 1943
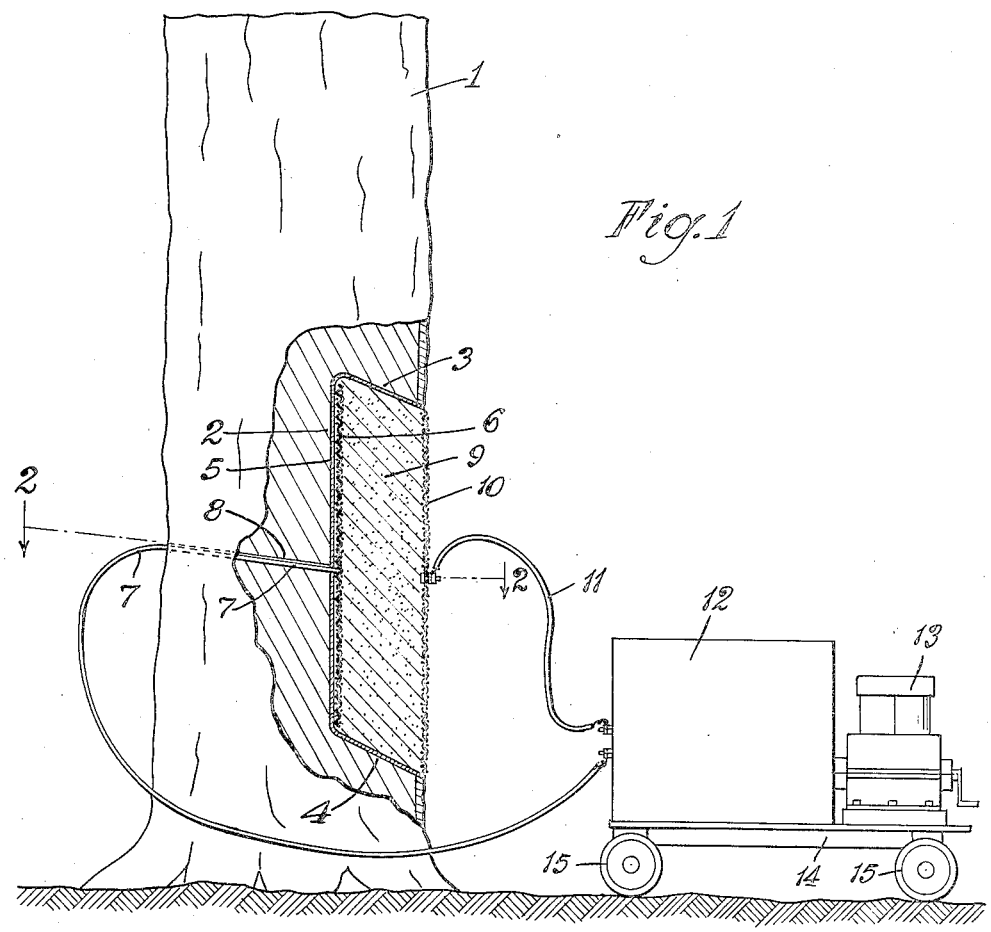
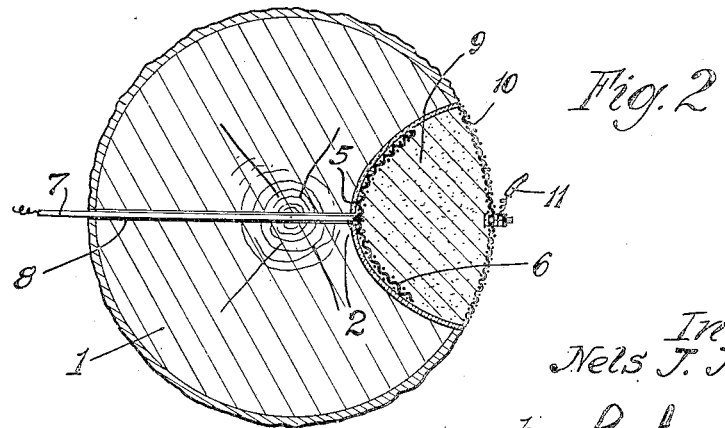
Inventor
Nels J. Johnson
by Parker & Carter
Attorneys Patented Apr. 25, 1944

2,347,324

UNITED STATES PATENT OFFICE 2,347,324

METHOD OF TREE TREATMENT

Nels J. Johnson, Evanston, Ill.

Application May 14, 1943, Serial No. 486,952

1 Claim. (Cl. 47—8)

This invention relates to a method of and a means for filling cavities in trees. One purpose is the provision of a method of tree treatment which will produce a cavity filling of minimum water absorption. Another purpose is the formation of a filling of maximum tensile strength. Another purpose is the provision of a filling which shall have less weight than the concrete fillings now employed and less shrinkage, and which approaches more closely the physical characteristics of the surrounding wood. Another purpose is the provision of a method of filling tree cavities which renders it unnecessary to provide expansion joints or articulation. Another purpose is the provision of a filling of thermoplastic or thermosetting material. Other purposes will appear from time to time in the course of the specification and claim.

I illustrate my invention more or less diagrammatically in the accompanying drawing, wherein Fig. 1 is a side elevation with parts in vertical section and Fig. 2 is a section on the line 2—2 of Fig. 1.

Like parts are indicated by like symbols throughout the specification and drawing.

Referring to the drawing, 1 generally indicates the tree to be treated. It is shown as having a cavity with an inside side wall 2, a top wall 3 and a bottom wall 4. In treating the tree it will be understood that the cavity is first cleaned out and formed to proper shape and all dead wood is removed. The face of the cavity may then be disinfected in any suitable fashion, and an insulating layer or liner 5 is applied. This liner may be of any suitable insulating material such as, for example, asbestos, and separates the filling from the inner surface of the cavity. It is advantageous that such liner be heat insulating so that there will be no risk of damaging the tree as a result of the heat produced during the treatment of thermoplastic or thermosetting material used as a filling. I employ high frequency alternating current in order to treat thermosetting or thermoplastic resins applied as a filler. The filler material, after it has been introduced into the cavity, may be subjected to polymerization produced through the use of radio frequency induction heating. A wide variety of thermoplastic or thermosetting resins are available, including phenolics, ureas and melamines. I do not wish to be restricted to any particular substance, but wish it to be understood that my invention includes filling a cavity such as a tree cavity with a filler substance which is put into final permanent condition by the subjection of the filler substance to high frequency induction heating. The filler may be applied as a paste or it may be preformed and inserted dry.

In heating it I employ an inner electrode 6 which may be inserted within or against the liner 5 in such fashion as to be in contact with the filler mass. A convenient and practical electrode may be in the form of a copper or other metal screen. This electrode may be connected with the conductor 7 extending through a hole 8 bored in the tree. After the electrode 6 is in position, the thermosetting or thermoplastic filler, in dry or paste form, may be inserted, as illustrated in the drawing, at 9. Against the exterior of this filler mass is applied the opposite or outer electrode 10, which may also be in the form of a metal screen. It is provided with a conductive connection 11. 12 generally indicates any suitable high frequency generator of alternating current. The details of the generator do not of themselves form part of the present invention and it is not shown in detail. 13 is any suitable relatively small engine which may, for example, be a gasoline unit and which serves to operate the generator. 14 is any suitable platform for the unit, and may for example be supported on wheels 15. The unit is preferably of such size as to be readily carried in a small truck or even in the back of an automobile. Any means may be employed for supporting it or for positioning it close enough to the tree for operation.

Assuming that the electrodes 6 and 10 are in position about the filler mass 9 and that the conductors 7 and 11 are connected in the circuit with the generator, the result of the passage of high frequency current between the electrodes 6 and 10 is to harden a thermosetting substance to the desired consistency. I may, for example, employ 100 watts at 50 to 100 megacycles, with as high frequency as possible. The heating, of course, takes place within the mass between the electrodes and the mass is not raised to a sufficiently high temperature to damage the tree.

In determining the treatment the size of the mass must be considered and the desired hardness of the final filler.

It is possible to polymerize fillers of a wide variety of shapes and of almost any size. It is possible, for example, to provide fillers of substantial length in trunks or along the main branches. In fillers of great length it may be preferable to heat them by steps, providing a sequence of adjacent electrodes along the length of the cavity. It is also possible to reinforce longer or larger cavities with steel rods or other reinforcing members.

In the practice of my invention I am able to reduce the weight of the fillers to one-quarter that of concrete, the substance prevailingly used in filling tree cavities. There is much less shrinkage. The filler has far less water absorption than concrete, the water absorption being as low as 1 to 2%. The filler, being less porous, is not so likely to be damaged by the penetration of water and its subsequent freezing. There is a great increase in tensile strength as compared to that of concrete.

It is possible to approach quite closely the characteristics of the surrounding wood. In fact, wood lamina or sawdust may be employed with a plastic binder or impregnating agent.

Owing to the increased tensile strength and to the relative flexibility of the filler as compared to concrete, a relatively flexible member is produced which need not be articulated or be provided with break or expansion joints. It is also possible to employ a plastic wood paste formed of finely divided wood with a plastic binder, which has approximately the same coefficient of expansion as the wood of the tree.

It will be realized that whereas I have described and shown a practical and operative method, many changes may be made without departing from the spirit of my invention, and I wish my disclosure to be taken as, in the broad sense, diagrammatic.

For example, I may employ thermosetting paste which may be troweled in wet or damp, and which may be contained in any suitable fashion, for example, by the employment of a fairly fine meshed screen as an electrode. Or I may preform the filler and insert it as a block or as a series of blocks into the cavity.

Any suitable solvent may be employed, for example, alcohol used with the thermosetting substance in paste form. The material may also be employed in powder form. When employing it in paste or powder form, it may be enclosed in any suitable container.

I claim:

The method of treating cavities in trees and the like, which includes cleaning the interior of the cavity, inserting in the interior of the cavity an electrode, passing a conductive connection from said electrode to the exterior of the tree, filling the cavity with a substance having, when subjected to heat, the general physical characteristics of the surrounding wood so far as relates to contraction and expansion in response to heat changes, and as to flexibility in response to flexure of the tree, applying a second electrode to the exterior of the filling so formed, and passing high frequency alternating current between the electrodes and through the substance in the cavity.

NELS J. JOHNSON.